Nov. 5, 1957     O. H. MANNISTO     2,812,001
ROCKABLE WORK SUPPORT MEANS IN A RECIPROCATING BENDER
Filed Aug. 31, 1954     2 Sheets-Sheet 1
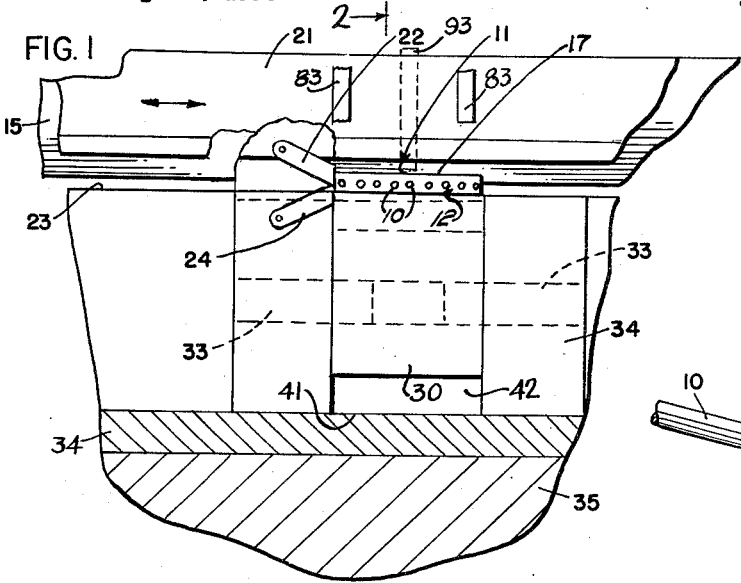
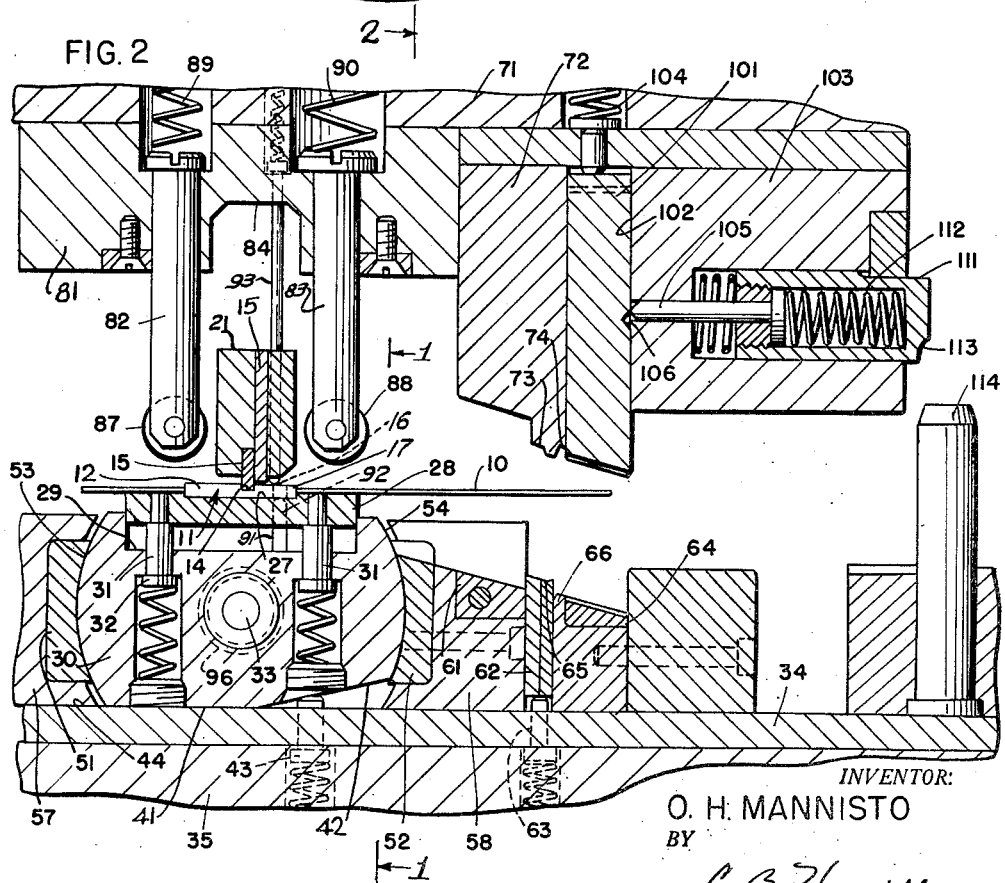
INVENTOR:
O. H. MANNISTO
BY
C. B. Hamilton
ATTORNEY Nov. 5, 1957 O. H. MANNISTO 2,812,001
ROCKABLE WORK SUPPORT MEANS IN A RECIPROCATING BENDER
Filed Aug. 31, 1954 2 Sheets-Sheet 2

INVENTOR:
O. H. MANNISTO
BY
C. B. Hamilton
ATTORNEY

United States Patent Office 2,812,001
Patented Nov. 5, 1957

2,812,001

ROCKABLE WORK SUPPORT MEANS IN A RECIPROCATING BENDER

Orville H. Mannisto, Chicago, Ill., assignor to Western Electric Company, Incorporated, New York, N. Y., a corporation of New York Application August 31, 1954, Serial No. 453,201

4 Claims. (Cl. 153—25)

This invention relates to article-forming apparatus, and more particularly to apparatus for forming Z-shaped bends in wires of wire spring relay combs.

In the manufacture of articles which have Z-shaped bends or the like, it is desirable to have the article so placed that the elements for forming the Z-shaped bends are moved at such an angle relative to the articles that shearing of the articles does not take place. Very often it is difficult to locate the parts or the articles in apparatus for bending the articles in positions such that shearing does not take place, particularly where articles are fed from other machines that form other operations on the articles to the machines associated with apparatus for forming the Z-bends in wires of wire spring relay combs.

An object of the invention is to provide new and improved apparatus for forming articles.

A further object of the invention is to provide new and improved apparatus for forming Z-bends in wires of wire spring relay combs.

Another object of the invention is to provide apparatus for forming Z-bends in articles without shearing the articles.

An apparatus illustrating certain features of the invention may include a pair of die elements movable together and apart between which an article is to have a portion thereof bent may be positioned, and means also may be provided for clamping the article and for tilting the article to optimum position as the dies close on the article to form sharp bends in the article.

An apparatus illustrating the invention more specifically may include a bottom platen having mounted thereon a rocker which is urged toward a position parallel to the platen but may be tilted relative to the platen to swing a portion of an article mounted on a clamping pad on the article downwardly to a die. A second platen is movable relative to the first platen and is provided with means for clamping the article to the pad and swinging the rocker prior to the engagement of a die mounted thereon which cooperates with the first-mentioned die to form a Z-bend in the article.

A complete understanding of the invention may be obtained by the following description of an apparatus forming a specific embodiment thereof, when read in conjunction with the appended drawings, in which:

Fig. 1 is a fragmentary vertical section of an apparatus forming a specific embodiment of the invention taken along line 1—1 of Fig. 2;

Fig. 2 is a fragmentary vertical section of the apparatus taken along the line 2—2 of Fig. 1;

Fig. 4 is a perspective view of an article formed by the apparatus.

Figure 3:
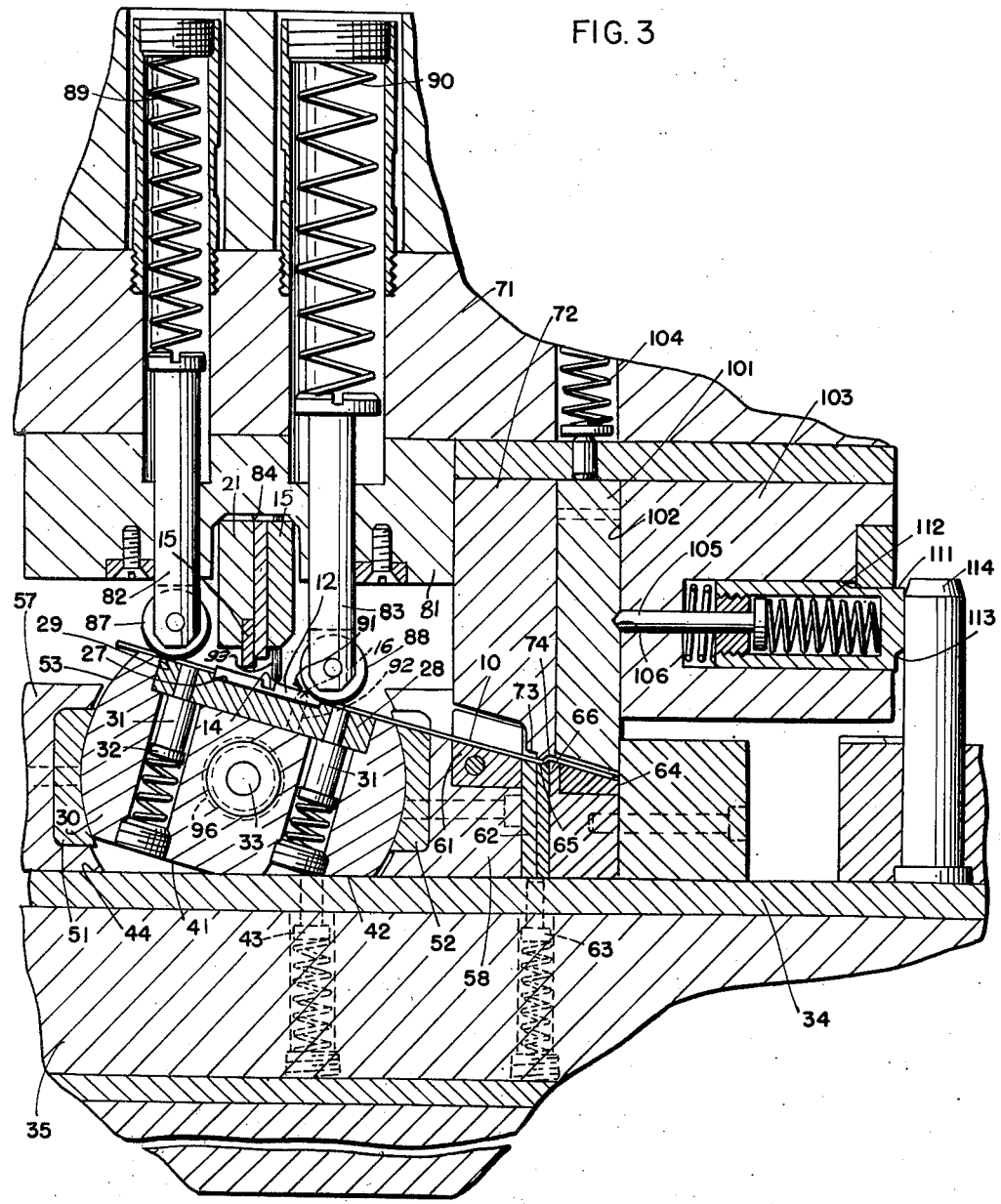
Fig. 3 is a view similar to that of Fig. 2 with the parts of the apparatus shown in different positions.

Referring now in detail to the drawings, there is shown therein an apparatus for forming wires 10 of a wire spring relay comb 11 into the form of a Z-shaped portion 12 and also forms a bow 13. The combs 11 include blocks 17 of plastic material having holes 16 therein and also are provided with grooves 14 into which fits a fixed guide bar 15. The combs 11 are fed by a feed bar 21 to the right, as viewed in Fig. 1, through pawls 22 which push each block 17 along a surface 23 just beyond a latching pawl 24 permitting each comb 11 to be moved toward the right but preventing movement of the comb to the left. The reciprocable feed bar 21 and the pawl 22 feed the block 17 into a groove 27 formed in a clamping pad 28, which is slidably mounted in a guideway or socket 29 in a rocker 30 and is urged upwardly in the rocker 30 by spring pressed plungers 31, the upward movement being limited by heads 32 formed on the plungers.

The rocker 30 is mounted pivotally on studs 33 supported by a bracket 34 mounted on a platen 35. The rocker 30 is provided with a stop surface 41 parallel to the upper face of the rocker and a second stop surface 42 at an angle to the stop surface 41. A spring pressed plunger 43 normally urges the rocker to a position in which the stop surface 41 engages a surface 44 of the bracket 34 so that the pad 28 is horizontal and the comb 11 thereon also is horizontal. However, the rocker 30 may be swung in a clockwise direction, as viewed in Fig. 2, to the position thereof shown in Fig. 3, and hardened guide shoes 51 and 52 engage arcuate surfaces 53 and 54 of the rocker to guide the rocker. The shoes 51 and 52 are mounted in blocks 57 and 58 mounted rigidly on the bracket 34. A grooved spacer insert 61 is provided to receive the wires 10 in properly spaced relation and a grooved die slide 62 having a bow-forming element 65 is urged upwardly by a spring pressed plunger 63 and also spaces the wires. A composite die 64 is mounted on the bracket 34 and platen 35 and includes a Z-bend forming portion 66.

An upper platen 71 has mounted thereon projecting from the lower surface thereof a die 72 having a bow-forming portion 73 and a Z-bend forming portion 74 for cooperating with the corresponding portions 65 and 66 of the die 64 to form the bow 13 and the Z-bend 12 when the die 72 is closed on the die 64. A guide block 81 secured to the platen 71 serves to guide plungers 82 and 83, and also is provided with a clearance notch 84 to permit movement of the platen 71 toward the platen 35 without interference by the guide bar 15 and the feed bar 21. The plungers 82 and 83 carry pressing rolls 87 and 88 thereon for engaging the pad 28 and are urged by springs 89 and 90, respectively, to positions normally closer to the pad 28 than the distance between the die 72 and the slide 62 when the platen 71 is retracted. The spring 89 is substantially weaker than the spring 90, and the springs 89 and 90 are sufficiently strong that, when the platen 71 is moved toward the platen 35 and the rolls 87 and 88 engage the pad 28, they first move the pad 28 to the bottom of the socket 29, and then the comb 11 moves with the pad away from the guide bar 15, being urged by a holddown plunger 93.

As the pad is so lowered, fixed, tapered pins 91 project through bores 92 in the pad and enter holes 16 in the block 17, the pins 91 being fixed rigidly to the rocker and being slidable in the bores 92. This precisely locates the comb on the pad. Then, on further movement of the platen 71 relative to the platen 35, the spring on the plunger 83 tilts the rocker 30 till the stop 42 engages the bottom 44 of the bracket 34 to position the wires 10 of the comb on the die 64. As the rocker 30 is so positioned, the die 72 moves down into engagement with the wires and forms the bows 13 and the Z-bends 12 in the wires. It should be noted that the angular portions of the forming portions of the dies 64 and 72 are at sufficient angles relative to the direction of movement of the dies 72 relative to the die 64 that the wires are easily formed without shearing action by the dies 64 and 72.

As the rocker 30 is moved to its operative or clockwise position, a clamping bar 101 mounted slidably in a slot 102 in a block 103 fixed to the platen 71 presses the wires against the slide 65 prior to engagement of the wires by the die 72, springs 104 urging the bar 101 downwardly, as viewed in Fig. 3. Then, as the platen 71 continues to move downwardly, the bar 101 remains stationary and a spring pressed pin 105 enters a notch 106 in the bar 101 to latch it to the platen 71. As the platen 71 is moved away from the platen 35 in the return stroke thereof, the bar 101 of the die 72 is moved away from the die 64, and a spring pressed pin 111 urged by a spring 112 urges the pin 105 to the left and is moved to a position in which a cam portion 113 moves off a camming pin 114. This releases the bar 101 and it moves downwardly below the dies 72. Thus, the bar 101 is prevented from distorting the wires on opening of the dies. After the platen 71 has been moved back through part of its return stroke, the plungers 82 and 83 along with the action of the spring pressed plunger 43 swing the rocker 30 back to its normal horizontal or loading position and swings the comb 11 to a horizontal position. Then, on further movement of the plungers 82 and 83 with the platen 71, the pad 28 is moved upwardly in the guideway 29 to push the block 17 back onto the guide bar 15 and the feed bar 21 is reciprocated to move the comb out of the press and to move another comb into the press.

The above-described apparatus serves to effectively form bows and Z-bends in wires, and also may be used to form coined or shaped portions on the wires with different dies. It makes the sharp bends without shearing the wires, even though substantially 90° angles or greater are formed on the wires, and the apparatus also facilitates the feed of the combs 11 into the apparatus and to and from other apparatus associated with the press described herein.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. An article-forming apparatus, which comprises a fixed bottom platen, a die having a Z-shaped forming portion mounted on the platen in a position in which the planes of the forming portion are oblique to the upper face of the platen, a support mounted rockably on the platen, a clamping pad mounted on the support and urged upwardly therefrom, means for urging the support to a position in which the pad is horizontal, an upper platen movable toward and away from the bottom platen, clamping means urged from the upper platen for pressing a portion of an article to be formed against the pad, means carried by the upper platen for moving the pad to the support and turning the support on the platen to swing a portion of the article to be formed to the die, and a second die mounted on the movable platen for bending the article with the first die.

2. A clamping device, which comprises a stationary platen, a rocker, means mounting the rocker pivotally on the platen between a first position in which one end of the rocker engages the platen and a second position in which the other end of the rocker engages the platen, a clamp pad on the rocker slidable toward and away from the rocker, means urging the pad away from the rocker, a movable platen movable toward and away from the stationary platen, means for pressing an article against the pad, a pair of differentially urged pressers carried by the movable platen for forcing the pad against the rocker and swinging the rocker on the stationary platen, and a locating pin on the rocker projectible beyond the pad when the pad is moved to the rocker.

3. A clamping device, which comprises a stationary platen, a rocker, means mounting the rocker pivotally on the platen between a first position in which one end of the rocker engages the platen and a second position in which the other end of the rocker engages the platen, a clamp pad on the rocker slidable toward and away from the rocker, means urging the pad away from the rocker, a movable platen movable toward and away from the stationary platen, and a plurality of differentially urged pressers carried by the movable platen for forcing the pad against the rocker and swinging the rocker on the stationary platen.

4. A clamping device, which comprises a stationary platen, a rocker having arcuate ends, means mounting the rocker pivotally on the platen between a first position in which one end portion of the rocker engages the platen and a second position in which the other end portion of the rocker engages the platen, a pair of arcuate bearings guiding the arcuate ends of the rocker, a clamp pad on the rocker slidable toward and away form the rocker, means urging the pad away from the rocker, a movable platen movable toward and away from the stationary platen, means for pressing an article against the pad, and a pair of differentially urged pressers carried by the movable platen for forcing the pad against the rocker and swinging the rocker on the stationary platen.

References Cited in the file of this patent

UNITED STATES PATENTS

| 495,592 | Knight | Apr. 18, 1893 |
| 1,790,506 | Karron | Jan. 27, 1931 |
| 2,103,562 | Smith | Dec. 28, 1937 |
| 2,433,808 | Cadman | Dec. 30, 1947 |

FOREIGN PATENTS

| 22,142 | Germany | June 6, 1883 |